United States Patent [19]

Lee, Jr.

[11] Patent Number: 4,530,507
[45] Date of Patent: Jul. 23, 1985

[54] VIBRATION DAMPENING AND WORKPIECE GUIDING ROLLERS FOR A CHUCK

[76] Inventor: Roy Lee, Jr., 10134 Briar Dr., Houston, Tex. 77042

[21] Appl. No.: 519,241

[22] Filed: Aug. 1, 1983

[51] Int. Cl.³ .......................... B23B 31/10; B23B 31/16
[52] U.S. Cl. ................... 279/1 Q; 82/DIG. 6; 82/DIG. 9; 279/123
[58] Field of Search ........ 82/38 A, 34 R, 20, DIG. 6, 82/DIG. 9; 279/1 L, 1 Q, 123

[56] References Cited

U.S. PATENT DOCUMENTS

| | | | |
|---|---|---|---|
| 2,815,959 | 12/1957 | Vandenberg | 279/123 |
| 3,038,361 | 6/1962 | Holzer | 82/20 X |
| 3,606,968 | 9/1971 | Loyd | 279/1 SJ X |
| 4,000,797 | 1/1977 | Ducanis | 82/38 A X |
| 4,317,427 | 3/1982 | Turner | 279/1 SJ X |

FOREIGN PATENT DOCUMENTS 0996103  2/1983  U.S.S.R. ................ 279/1 L

Primary Examiner—Z. R. Bilinsky
Attorney, Agent, or Firm—Vaden, Eickenroht, Thompson & Jamison

[57] ABSTRACT

An apparatus is disclosed for a chuck with a guide roller assembly useful in automatic and semi-automatic machining operations. This apparatus provides for a chuck with a guide roller assembly that will prevent the end of the pipe from striking the jaws of the chuck as the pipe is moved into position to be gripped by the chuck and that will exert a vibration dampening force on the pipe while the pipe.

Also disclosed is a plurality of rollers that are mounted on the jaws of the chuck on the side of the jaws toward which the workpiece travels as it is moved into position to be gripped by the chuck and that are made of an elastomeric material and positioned to engage the workpiece ahead of the jaws of the chuck so that the rollers will be compressed as the jaws of the chuck move into engagement with the workpiece to provide a vibration dampening force on the pipe on the side of the chuck away from the machining operations.

6 Claims, 7 Drawing Figures

U.S. Patent   Jul. 23, 1985   Sheet 3 of 3   4,530,507
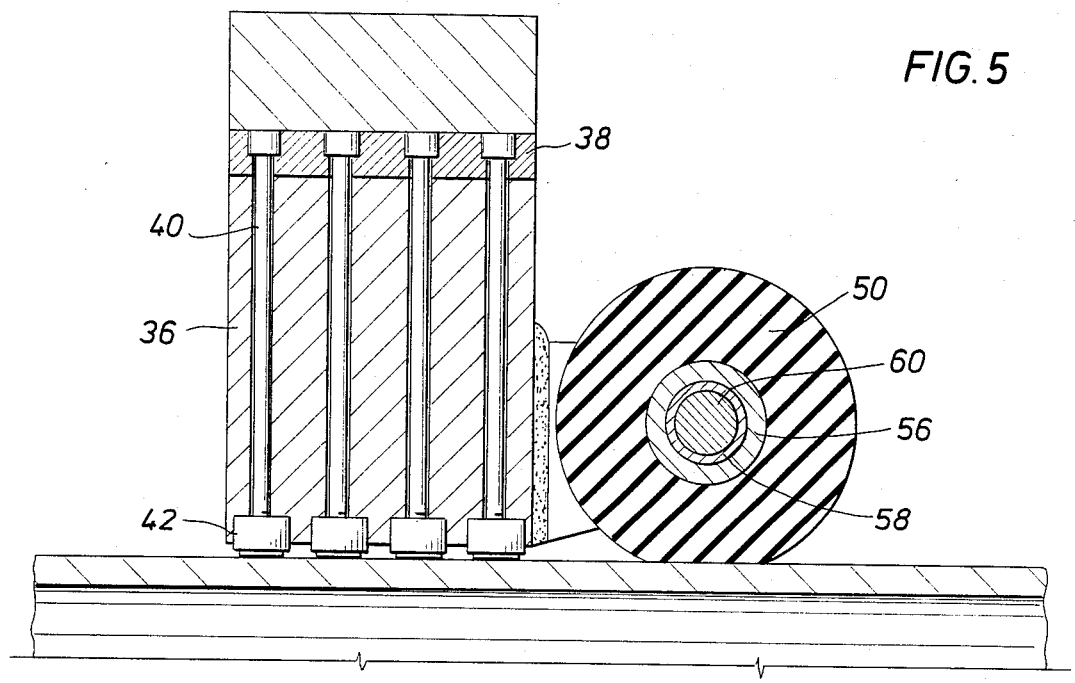
FIG. 5
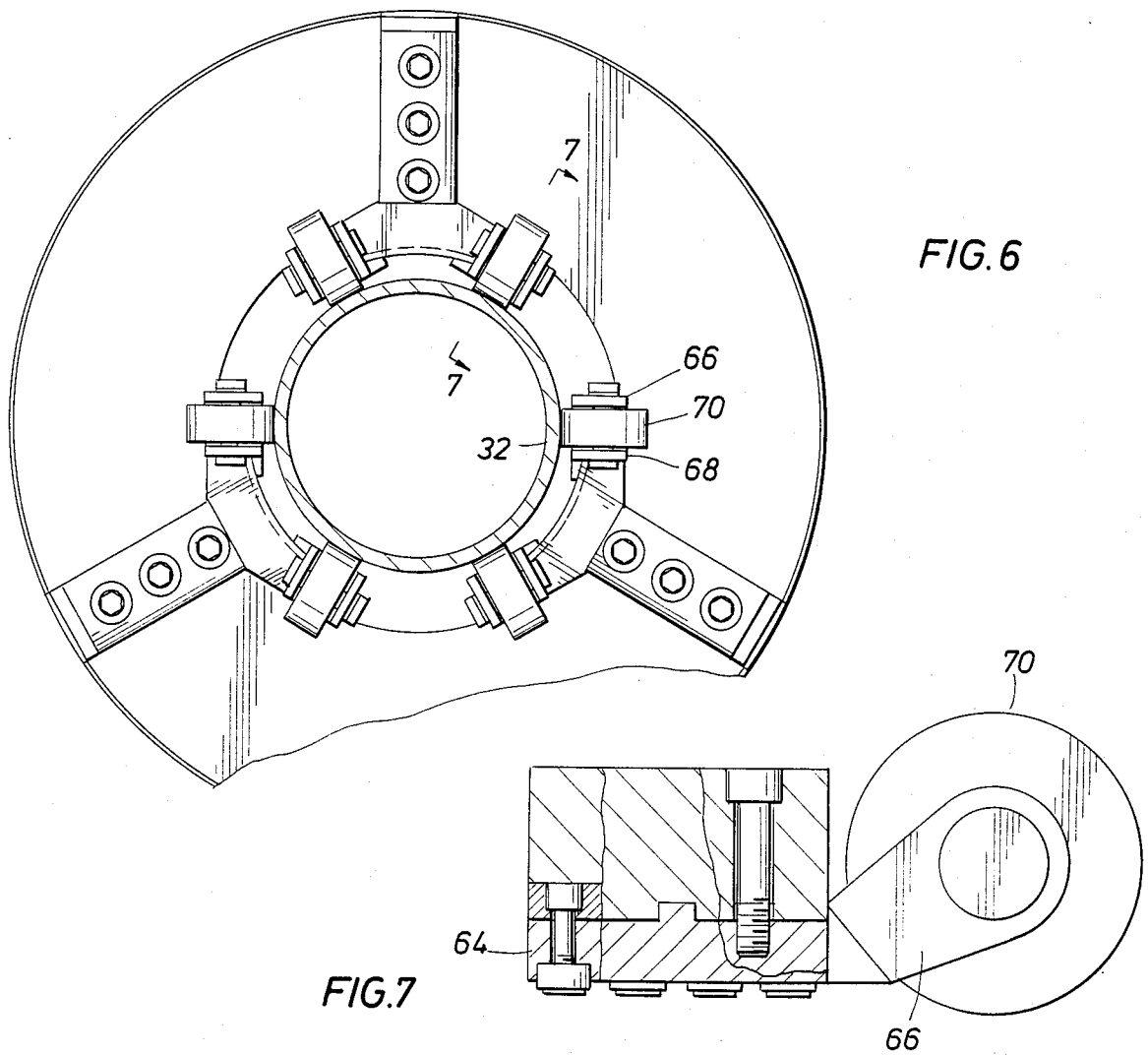
FIG. 6
FIG. 7

VIBRATION DAMPENING AND WORKPIECE GUIDING ROLLERS FOR A CHUCK

This invention relates to chucks generally, and in particular to chucks of the universal type that are used to hold a workpiece and to rotate a workpiece during a machining operation.

The chuck of this invention has utility in most any application, but it is particularly useful in automatic and semi-automatic machining operations, such as cutting threads on pipe. For example in most pipe threading operations today, the pipe is moved on a conveyor belt under the control of an operator into the opening of the chuck on the threading lathe. The opening in the chuck and the line of travel of the pipe on the conveyor is carefully aligned. But most pipe joints are not straight and often the end of the pipe will hit one of the jaws of the chuck as it is being moved into the chuck. This damages the end of the pipe and also the chuck.

To take advantage of the high cutting speeds that can be used with todays cutting tools, the pipe is rotated at a relatively high speed during the machining operation. As stated above, most pipe joints are not straight, and the high speed rotation produces much wobbling and lateral movement of the pipe on its support as it is being machined. This creates vibrations in the pipe that are often transmitted to the end of the pipe being machined and makes it difficult to maintain the tolerances required for the threads being cut.

Therefore, it is an object of this invention to provide a chuck with a guide roller assembly that will prevent the end of the pipe from striking the jaws of the chuck as the pipe is moved into position to be gripped by the chuck and that will exert a vibration dampening force on the pipe while the pipe.

It is a further object of this invention to provide a chuck having a plurality of rollers that are mounted on the jaws of the chuck on the side of the jaws toward which the workpiece travels as it is moved into position to be gripped by the chuck and that are made of an elastomeric material and positioned to engage the workpiece ahead of the jaws of the chuck so that the rollers will be compressed as the jaws of the chuck move into engagement with the workpiece to provide a vibration dampening force on the pipe on the side of the chuck away from the machining operations.

These and other objects, advantages, and features of this invention will be apparent to those skilled in the art from a consideration of this specification, including the attached drawings and appended claims.

In the drawings:

FIG. 5 is a sectional view of the chuck of FIG. 4 in engagement with the pipe;

FIG. 6 is a front view of the chuck jaw of FIG. 1 gripping a tubular member of larger diameter; and FIG. 7 is a cross sectional view taken along line 7—7 of FIG. 6.

Figure 1:
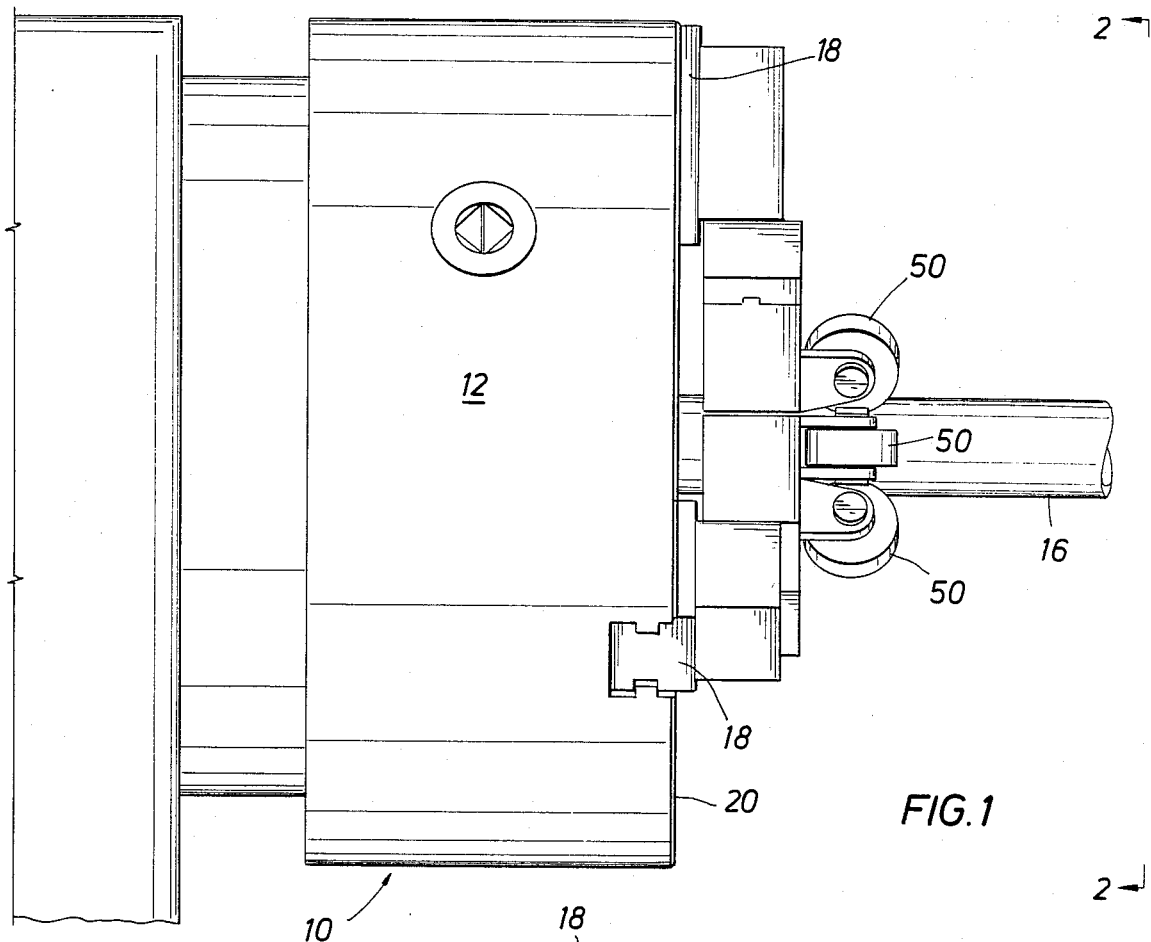
FIG. 1 is a side view, in elevation, of a universal clutch equipped with the apparatus of this invention.

Chuck 10 is a conventional power chuck, such as a Model BBLC-850/375 ES-25 SMW Power Chuck designed to handle 4½" through 13¾" O.D. casing. It includes body 12 and opening 14 through which a workpiece, in this case tubular member 16, extends to be gripped by the chuck. Three chuck jaw supporting members 18 are mounted in radial grooves in face 20 of the chuck body to move radially toward and away from the center of opening 14 of the chuck. A power source (not shown) moves the support members in and out under the direction of an operator. Chuck jaws 22 are bolted to these members for movement in and out with the members.

Each chuck jaw is identical and includes mounting member 24 which is attached to members 18 by bolts 26 and generally arcuate chuck jaw insert supporting portion 28 to which jaw inserts 30 are attached. The jaw inserts are designed for the particular diameter of the workpiece the chuck is to engage since the movement of the jaws in and out toward and away from the workpiece is limited.

Figure 2:
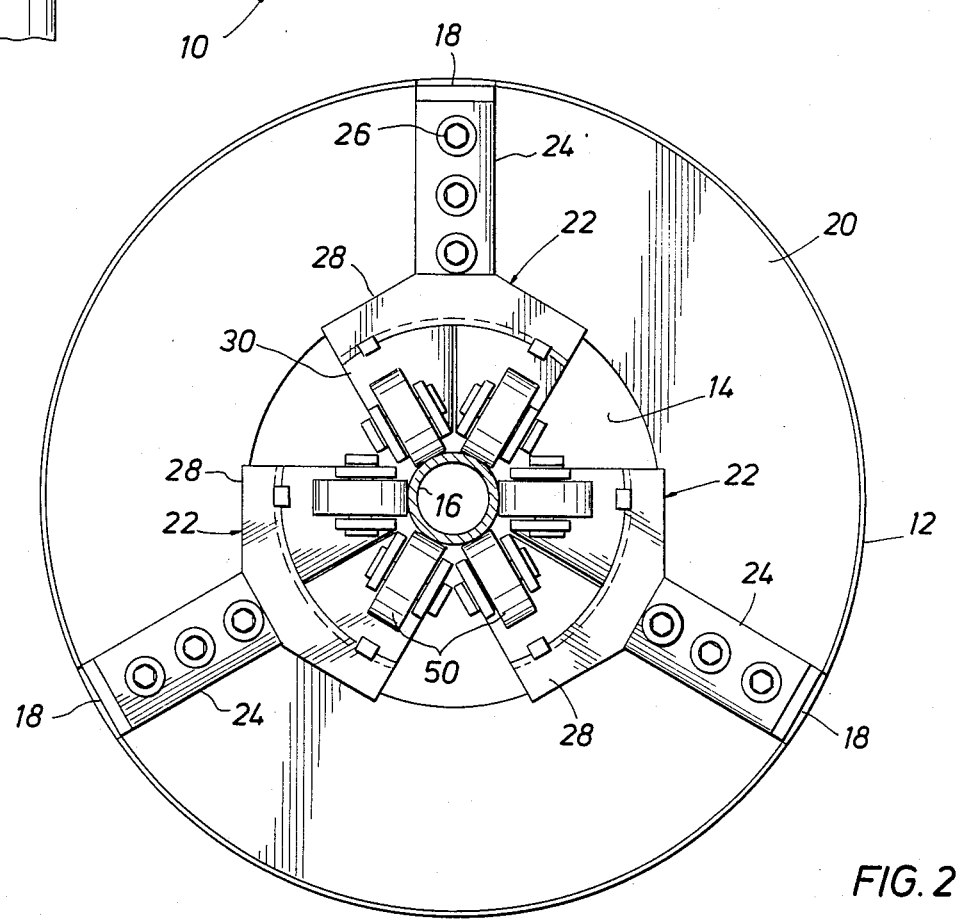
FIG. 2 is a front view of the chuck looking in the direction of arrows 2—2 in FIG. 1.

In FIG. 2, tubular member 16 is 4½" casing and represents the smaller diameter of pipe that can be gripped by this particular chuck. In FIG. 6, tubular member 32 is 13⅜" casing and represents the largest diameter that can be gripped by this chuck.

Figure 3:
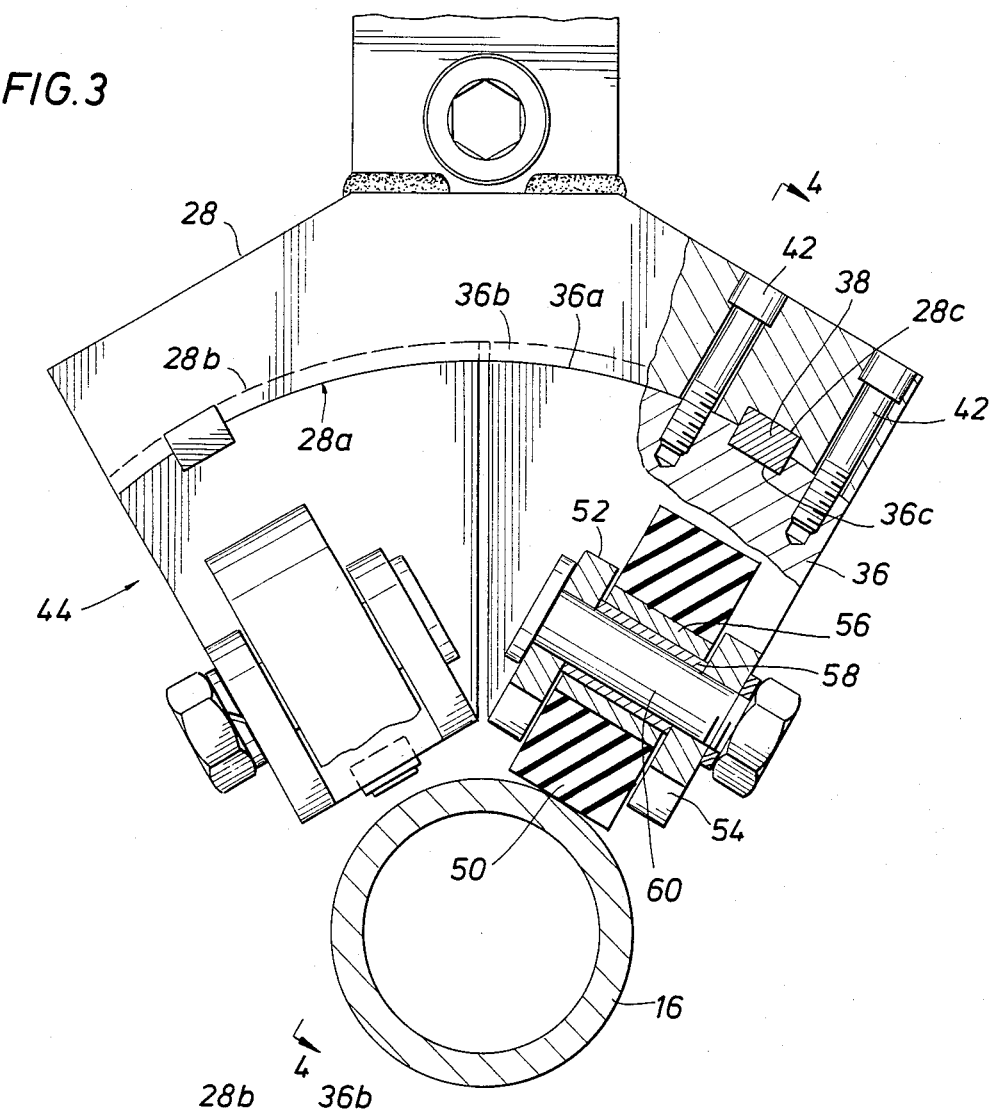
FIG. 3 is a view, partially in elevation and partially in section, of one of the jaws of the chuck of FIG. 1 as it is moves into engagement with a workpiece.
Figure 4:
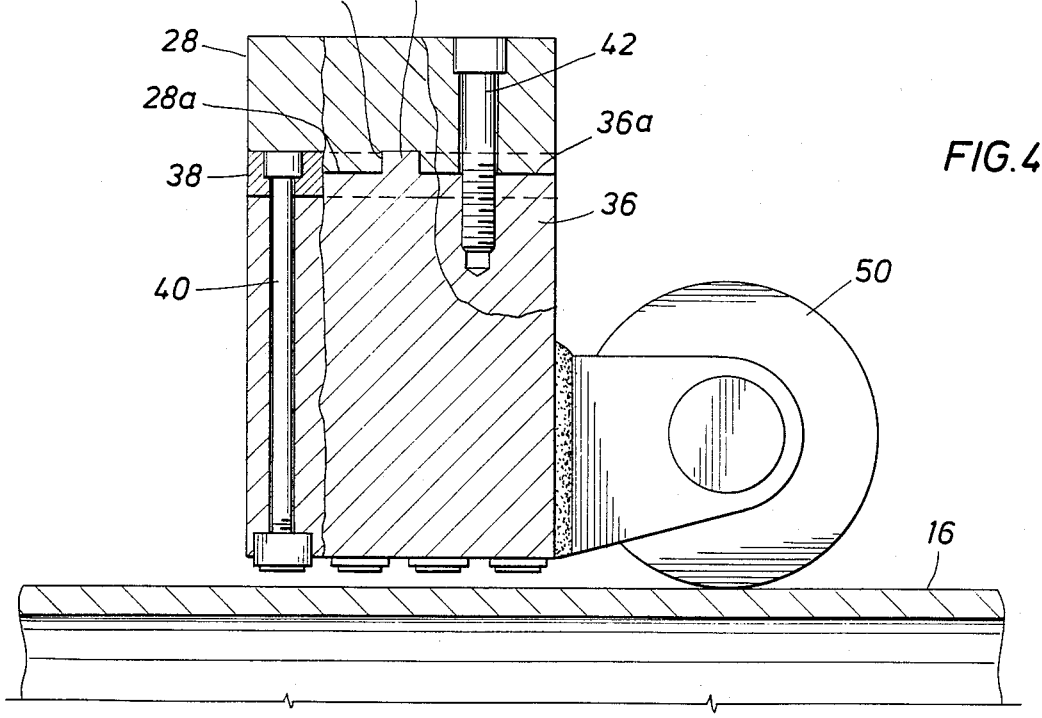
FIG. 4 is a sectional view taken along line 4—4 of FIG. 3.

The chuck insert structure for the 4½" O.D. casing is shown in more detail in FIGS. 3, 4, and 5. It includes insert body 36 having an arcuate upper surface 36a as shown in FIG. 3 that matches arcuate surface 28a of insert support member 28. Arcuate groove 28b in arcuate surface 28a receives key 36b machined in the top of insert body 36. Engagement of key 36b and groove 28b hold insert body 36 from movement relative to support member 28 to the left or right as viewed in FIG. 4.

Opposing keyways 28c and 36c in surfaces 28a and 36a in surfaces 28a and 36a are engaged by transverse key 38 to hold jaw insert 36 from moving relative to support member 28 to the left or right as viewed in FIG. 3. Key 38 is held in place by bolts 40, four of which are shown in this embodiment, that extend through body 36 of the insert and hold tungsten carbide chuck jaw grippers 42 in openings provided therefor on the inside surface of insert body 36. The insert assembly with the tungsten carbide chuck jaw grippers and key 38 are attached to insert support member 28 by bolts 42 as shown in FIGS. 3 and 4.

In this embodiment, each jaw support member 28 supports two inserts. Insert 44 is also attached to support member 28 in FIG. 3 is a mirror image of insert 36 and is attached to the insert support member in the same manner. Thus, in the particular chuck illustrated, there will be two inserts per jaw with the result that there will be six rows of tungsten carbide chuck jaw grippers in engagement with the pipe during machining operations.

In accordance with this invention, a plurality of vibration dampening members are attached to the jaws of the chuck for movement with the jaws and to be compressed against the workpiece when the jaws move into engagement with the work piece. In the embodiment shown, the vibration dampening members comprise disk shaped rollers 50 made out of an elastomeric material, such as rubber, polyurethane, or nylon. Means are provided to mount members or rollers 50 on the jaws of the chuck for movement therewith and to engage the workpiece before the jaws so that when the jaws are moved into engagement with the workpiece so that the rollers will be compressed against the workpiece to absorb and dampen vibrations in the work piece from machining operations thereon.

In the embodiment shown, all of the rollers are mounted on the jaws in the same manner so only one will be described in detail. As shown in FIGS. 3, 4, and 5, mounting arms 52 and 54 have one end welded to insert body 36 and extend outwardly therefrom in parallel, spaced, relationship. Roller 50 is molded on bushing 56 to provide a metal to metal bearing surface with bearing sleeve 58, which is preferably made of brass. The roller and bearing sleeve are supported between the two mounting arms by bolt 60. The vibration absorbing member is free to rotate on bolt 60 and it is shaped as a roller so that it can act as a guide to keep pipe or any workpiece from striking any of the jaws of the chuck to insure that the rollers do initially engage the pipe or workpiece and protect the jaws of the chuck, the lower edge of each roller is positioned below the lower end of the tungsten carbide chuck jaw grippers. This also results in the compression of the elastomeric material of the roller when the jaws of the chuck are moved into engagement with the workpiece, causing the rollers to exert a compressive force on pipe 16. Vibrations imposed in the pipe by its high speed rotation during the machining operation, will tend to be absorbed by the resilient material of the rollers and reduce the amplitude of the vibrations that reach the end of the pipe being machined. In one embodiment of this invention, the distance the rollers extend below or beyond the lower edge of the jaws is about $\frac{1}{4}''$. As shown in FIG. 4, roller 50 has engaged pipe joint 16 and will now be compressed as the jaws which are still spaced from pipe joint 16 are moved into engagement with the pipe joint. This condition is shown in FIG. 5 where wheel 50 has a flat lower surface caused by the compression of the elastomeric material against the work piece. There will, of course, be some distortion in the symmetry of the disc at this point, but it is not shown in the drawing.

In FIG. 6, the jaw inserts are designed for 13 $\frac{3}{8}''$ diameter casing. As a result, as shown in FIG. 7, insert body 64 is much thinner and mounting arms 66 and 68 extend away from body 64 at an angle so that the same diameter roller 70 can be used for this size pipe. The insert is attached to the insert supporting members of the jaws in the same manner as described above in connection with the chuck used for $4\frac{1}{2}''$ O.D. casing.

From the foregoing it will be seen that this invention is one well adapted to attain all of the ends and objects hereinabove set forth, together with other advantages that are obvious and that are inherent to the apparatus.

What is claimed is:

1. A chuck for holding a workpiece during a machining operation comprising a body having an opening therein through which a workpiece can extend, a plurality of jaws supported by the body for engaging a workpiece at spaced points on the circumference of the workpiece to hold the work piece from rotation relative to the chuck, means for moving the jaws into and out of engagement with a workpiece, a plurality of vibration dampening members of elastomeric material, and means mounting the members on the jaws for movement therewith and to engage the workpiece before the jaws when the jaws are moved into engagement with the workpiece and to be compressed against the workpiece to absorb and dampen vibrations in the workpiece from machining operations thereon.

2. The chuck of claim 1 in which the vibration dampening members are disc shaped and the mounting means position the disc shaped members on the side of the jaws toward which the workpiece moves to enter the opening in the chuck, said mounting means including means mounting the disc shaped members for rotation around an axis transverse the longitudinal axis of the workpiece to guide the work piece into the opening and hold it out of engagement with the jaws until it is in the desired position in the chuck opening.

3. The chuck of claim 1 or 2 in which the vibration dampening members are made of polyurethane.

4. The chuck of claim 1 or 2 in which the vibration dampening members are made of nylon.

5. In a universal chuck for holding a workpiece from lateral movement during a machining operation having a body with a central opening through which a workpiece may extend, three jaws supported by the body, and means for moving the jaws into and out of holding engagement with a work piece, the improvement comprises a roller assembly attached to each jaw including a roller of resilient material mounted for rotation around an axis transverse the longitudinal axis of the workpiece and having a diameter such that the roller extends in the direction of the workpiece beyond the jaw to which it is attached to be compressed against the workpiece when the jaws are in engagement with the workpiece to exert a resilient force on the workpiece at a point spaced from the jaws of the chuck to provide an additional holding force on the workpiece and to absorb and dampen vibrations introduced into the workpiece by a machining operation.

6. In a universal chuck for rotating a workpiece having a body with a central opening through which a workpiece may extend, three jaws supported by the body, and means for moving the jaws into and out of holding engagement with a workpiece, the improvement comprising a roller assembly attached to each jaw including a roller of resilient material mounted for rotation around an axis transverse the longitudinal axis of the workpiece and having a diameter such that the roller extends in the direction of the workpiece beyond the jaw to which it is attached to protect the jaw from being struck by the workpiece as it is moved into the chuck and to be compressed against the workpiece when the jaws are in engagement with the workpiece to exert a resilient force on the workpiece at a point spaced from the jaws of the chuck to provide an additional holding force on the workpiece and to absorb and dampen vibrations introduced into the workpiece by a machining operation.

* * * * *